United States Patent
Ieda et al.

(10) Patent No.: US 6,675,873 B2
(45) Date of Patent: Jan. 13, 2004

(54) AUTOMOTIVE AIR-CONDITIONER HAVING ELECTRIC HEATER AND ELECTRICALLY DRIVEN COMPRESSOR

(75) Inventors: Hisashi Ieda, Nagoya (JP); Ken Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/175,585

(22) Filed: Jun. 19, 2002

(65) Prior Publication Data
US 2003/0010487 A1 Jan. 16, 2003

(30) Foreign Application Priority Data

Jul. 12, 2001 (JP) ........................................ 2001-212427

(51) Int. Cl.[7] .............................................. B60H 1/00
(52) U.S. Cl. .................................... 165/43; 219/203
(58) Field of Search .................... 165/42, 43; 219/208; 62/228.4

(56) References Cited

U.S. PATENT DOCUMENTS

| | | | |
|---|---|---|---|
| 5,419,149 A | * 5/1995 | Hara et al. ...................... 62/160 |
| 5,501,267 A | 3/1996 | Iritani et al. .................... 165/29 |
| 5,706,667 A | * 1/1998 | Iritani et al. .................... 62/230 |
| 6,070,650 A | 6/2000 | Inoue et al. ..................... 165/42 |
| 6,118,099 A | * 9/2000 | Lake et al. ..................... 219/202 |
| 6,209,331 B1 | * 4/2001 | Lake et al. ...................... 62/180 |
| 6,347,528 B1 | * 2/2002 | Iritani et al. ................. 62/324.6 |
| 6,581,678 B1 | * 6/2003 | Groemmer et al. ............ 165/42 |

* cited by examiner

*Primary Examiner*—William E. Tapolcai
(74) *Attorney, Agent, or Firm*—Harness, Dickey & Pierce, PLC

(57) ABSTRACT

An air-conditioner for use in an electric vehicle or a hybrid vehicle includes an electric heater for heating water circulating through a heater core and a compressor for compressing refrigerant in a refrigeration cycle. The electric heater is powered by an on-board battery, and the compressor is also driven by the same on-board battery. When a voltage of the on-board battery abnormally increases to a first predetermined level, the electric heater is switched off to prevent the electric heater from being overheated. When the voltage further increases to a second predetermined level, operation of the compressor is also terminated. Thus, the electric heater is properly protected from the abnormally high voltage while properly keeping performance of the air-conditioner.

7 Claims, 4 Drawing Sheets

AUTOMOTIVE AIR-CONDITIONER HAVING ELECTRIC HEATER AND ELECTRICALLY DRIVEN COMPRESSOR

CROSS-REFERENCE TO RELATED APPLICATION

This application is based upon and claims benefit of priority of Japanese Patent Application No. 2001-212427 filed on Jul. 12, 2001, the content of which is incorporated herein by reference.

BACKGROUND OF THE INVENTION

1. Field of the Invention

The present invention relates to an automotive air-conditioner that includes a compressor driven by an electric motor powered by an on-board battery and an electric heater powered by the on-board battery.

2. Description of Related Art

In an air-conditioner mounted on an electric vehicle, a compressor of the air-conditioner cannot be driven by an engine. Accordingly, the compressor is driven by an electric motor powered by an on-board battery, and an electric heater is used as a heat source for heating. Examples of the air-conditioner of this kind are disclosed in JP-A-5-229334 and JP-A-10-157445. Usually, a rated voltage of an on-board battery for driving an electric vehicle is high, such as 288 volts, and a terminal voltage of the buttery may abnormally rise to a level much higher than the rated voltage due to various reasons. In case the battery voltage becomes abnormally high, an excessively high current which causes damages in the electric heater is supplied to the electric heater. Further, because the electric heater is overheated in such an occasion, a problem in safety may occur. Though the air-conditioner disclosed in the above publications includes an electric heater, such an overheating problem is not considered, and therefore no solution to that problem is mentioned.

SUMMARY OF THE INVENTION

The present invention has been made in view of the above-mentioned problem, and an object of the present invention is to provide an improved air-conditioner for use in an electric vehicle, in which adverse effects to an electric heater due to abnormal increase of a battery voltage are eliminated.

The air-conditioner includes a compressor for compressing refrigerant in a refrigeration cycle and an electric heater for heating water circulating through a heater core. The air-conditioner is mounted on a vehicle electrically driven by an on-board battery or a vehicle driven by both of an internal combustion engine and an on-board battery. Both of the electric heater and the compressor are powered by the on-board battery.

The electric heater is switched off when a voltage of the on-board battery reaches a first predetermined level which is considerably higher than a rated voltage of the on-board battery to prevent the electric heater from being overheated. When the voltage of the on-board battery further increases to a second predetermined level, the compressor is also turned off to secure durability of the compressor. Preferably, the first predetermined voltage level is set to a level at which the heater output power becomes about two times of the heater output power obtained at the rated voltage. Preferably, a voltage detector for detecting the on-board battery voltage and a switching circuit for controlling operation of the electric heater are integrally built in an inverter that controls operation of the compressor.

Though a voltage range in which the electric heater is operated is set to a narrower range than that of the compressor, the hot water heated by the electric heater can properly maintain a desired temperature because hot water has a high heat capacity. The electric heater is protected from overheating due to abnormal increase of the voltage of the on-board battery.

Other objects and features of the present invention will become more readily apparent from a better understanding of the preferred embodiments described below with reference to the following drawings.

DETAILED DESCRIPTION OF THE PREFERRED EMBODIMENTS (First Embodiment)

Figure 1:
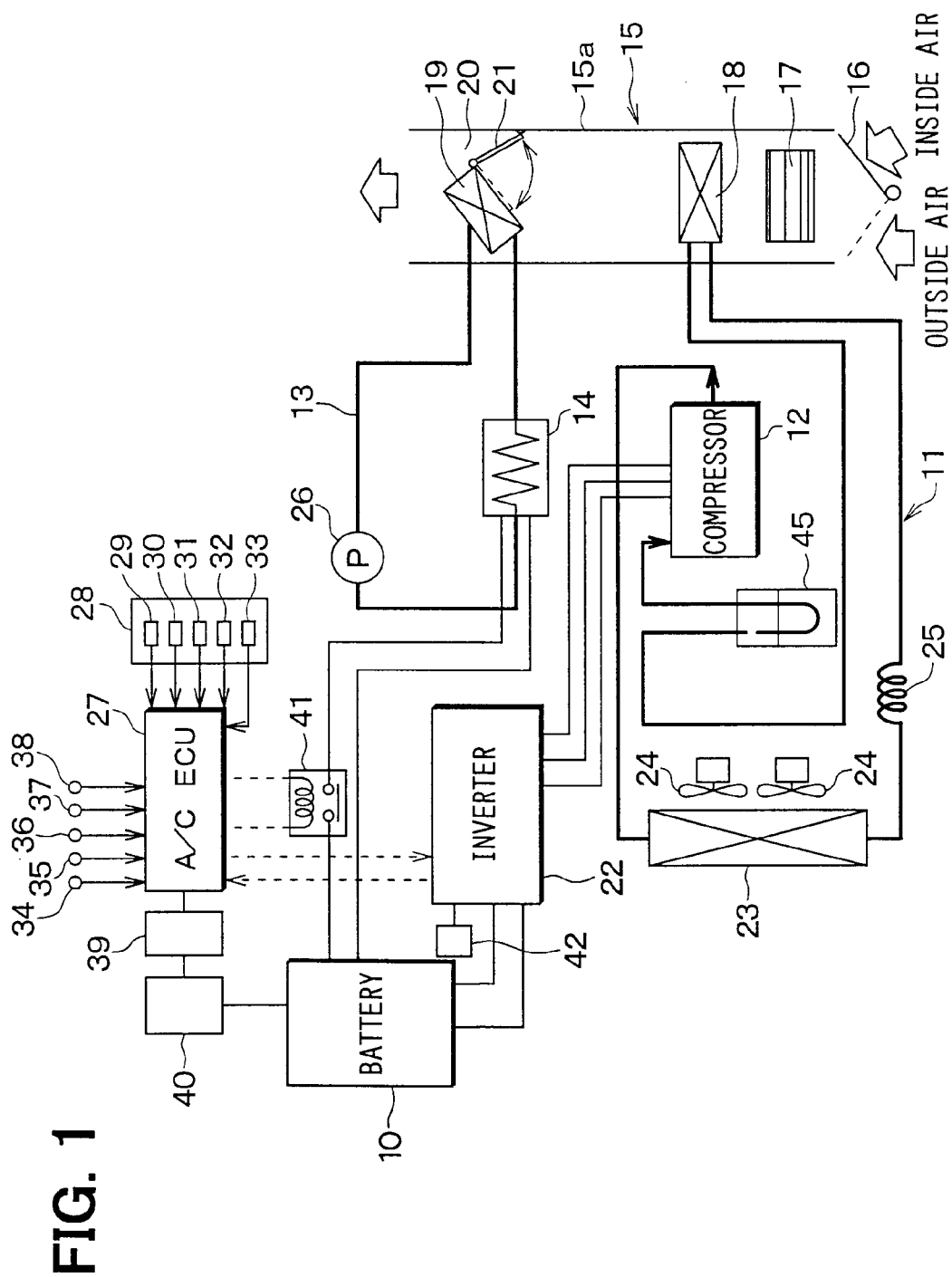
FIG. 1 is a block diagram showing an entire structure of an air-conditioner, as a first embodiment of the present invention.

An air-conditioner as a first embodiment of the present invention is shown in FIG. 1. The air-conditioner is mounted on a vehicle powered by a fuel cell (not shown). The fuel cell charges an on-board battery 10 which in turn supplies power to the air-conditioner. Because the battery 10 also supplies power to a driving motor (not shown) for driving the vehicle, its rated voltage is as high as, e.g., 288 volts. Electric power is supplied from the battery 10 to a compressor 12 and an electric heater 14 in the air-conditioner.

An entire structure of the air-conditioner will be briefly described with reference to FIG. 1. The air-conditioner is composed of an in-room unit 15 disposed in a passenger compartment, a refrigeration cycle 11 for cooling, and a heating circuit 13 for heating. The in-room unit 15 is usually disposed inside of instrument panel.

A casing 15a of the in-room unit 15 forms an air passage through which conditioned air is introduced into the passenger compartment. A switching door 16 for selectively introducing outside air or inside air into the casing 15a is disposed at an upstream end of the casing 15a. The air introduced into the casing 15a is blown toward a downstream end of the casing 15a by an electric centrifugal blower 17. An evaporator 18 for cooling the introduced air is disposed downstream of the blower 17. A heater core 19, in which hot water circulates, for heating the air in the casing 15a is disposed downstream of the evaporator 18. A bypass passage 20 is formed at a side of the heater core 19. An air-mixing door 21 is disposed at a side of the heater core 19 so that an amount of air flowing through the heater core 19 relative to an amount of air flowing through the bypass passage 20 is controlled.

A device for switching blowing modes (not shown) is disposed at a downstream end of the casing 15a. That is, a defroster-mode in which conditioned air is blown toward a windshield, a face-mode in which conditioned air is blown toward a passenger's face, and a foot-mode in which conditioned air is blown toward passenger's feet are selectively switched by the switching device.

The refrigeration cycle 11 is composed of a compressor 12, a condenser 23, a de-pressurizer 25 and an evaporator 18. The compressor 12 is contained in a single case together with an electric motor for driving the compressor 12. The electric motor is a three-phase alternating current motor. A rotational speed of the electric motor for driving the compressor 12 is controlled by an inverter 22, and an amount of compressed refrigerant delivered from the compressor 12 is varied according to the rotational speed of the motor. The pressurized gaseous refrigerant delivered from the compressor 12 is supplied to the condenser 23 and is condensed therein by exchanging heat with outside air which is blown to the condenser 23 by blowers 24.

The high pressure refrigerant condensed in the condenser 23 is sent to a de-pressurizer 25 constituted by a fixed orifice such as a capillary tube and is expanded and depressurized therein, forming low pressure refrigerant in a liquid-gas mixed state. The mixed state refrigerant is supplied to the condenser 18 disposed in the casing 15a and is evaporated therein by exchanging heat between the refrigerant and air flowing through the casing 15a, thereby cooling the air. The evaporated refrigerant is sent to an accumulator 45, and then returned to the compressor 12. The refrigerant returned to the compressor 12 is compressed again.

The heating circuit 13 is composed of an electrically driven water pump 26, a heater core 19 disposed in the casing 15a, and an electric heater 14. Hot water heated in the electric heater 14 is supplied to the heater core 19 and circulated in the heating circuit 13 by operation of the water pump 26. The electric heater 14 is constituted by a sheath heater composed of a resistor made of a material having a low temperature coefficient, such as nickel-chrome or iron-chrome, and a metallic sheath having a high heat-conductivity in which the resistor is hermetically contained.

Figure 2:
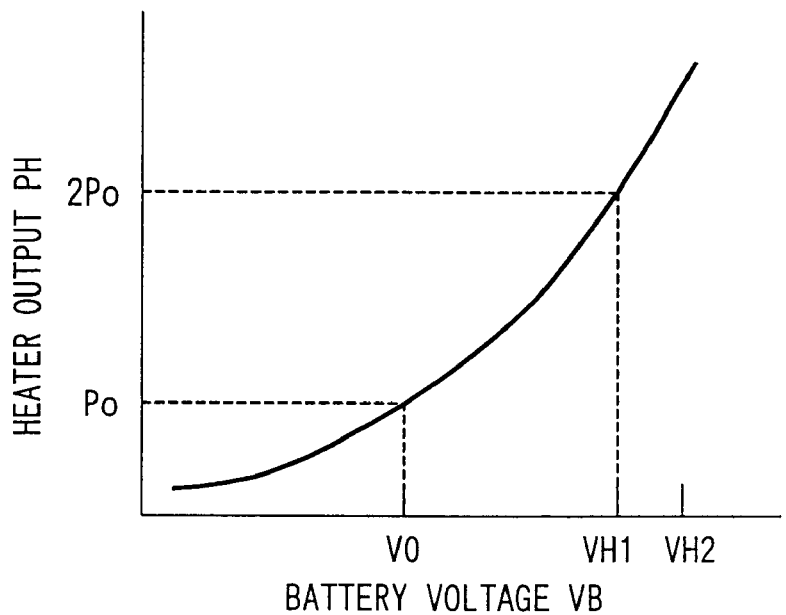
FIG. 2 is a graph showing a relation between a voltage of an on-board battery and an output power of an electric heater.

The electric heater 14 has a characteristic as shown in FIG. 2. The heater output PH is substantially proportional to a square value of the battery voltage VB. A heater output Po at a rated battery voltate VO increases to 2Po when the battery voltage VB increases to a first predetermined voltage VH1 which will be explained later.

An electronic control unit ECU 27 shown in FIG. 1 controls various components included in the refrigeration cycle 11, the in-room unit 15, and the heating circuit 13. Signals from a control panel 28 and signals from a group of sensors 34–38 are all fed to the ECU 27. The ECU 27 is composed of a microcomputer and other associated circuits and powered by an auxiliary battery 39. The auxiliary battery 39 is charged by the on-board battery 10 through a DC-DC converter 40 at a voltage level, e.g., 12 volts. The auxiliary battery 39 also supplies power to other auxiliary components.

The control panel 28 includes a group of control switches 29–33 from which operational conditions of the air-conditioner are fed by a passenger: an air-conditioner switch 29 for turning on or off the compressor 12; a switch 30 for operating the switching door 16 to selectively introduce outside air or inside air into the casing 15a; a temperature setting switch 31 for setting a desired temperature in the passenger compartment; a switch 32 for changing an amount of air blown by the blower 17; and a blowing mode setting switch 33 for selecting a blowing mode from three modes, the defroster mode, the face mode, and foot mode.

Various information for controlling the air-conditioner is inputted to the ECU 27 form the group of sensors 34–38: an inside air temperature sensor 34 for detecting a temperature TR in the passenger compartment; an outside air temperature sensor 35 for detecting a temperature TAM of outside air; a sunshine amount sensor 36 for measuring an amount TS of sunshine incident upon the passenger compartment; a sensor 37 for detecting a temperature TE of air blown out of the evaporator 18; and a hot water temperature sensor 38 for detecting a temperature TW of the hot water circulating in the heating circuit 13.

Electric power is supplied to the electric heater 14 from the battery 10 through a switching circuit 41 composed of a relay which is controlled by the ECU 27. Since a high voltage is supplied to the electric heater 14 from the battery 10, the electric heater 14 can be made compact, compared with a case where a low voltage is supplied. A voltage detector 42 for detecting the battery voltage VB of the battery 10 is provided, and a signal indicating the detected voltage is fed to an inverter 22 and also to the ECU 27 through the inverter 22. Though the ECU 27 are connected to various components in the air-conditioner through control lines, those control lines are not shown in FIG. 1 to avoid complication. Only control lines connected to the inverter 22 and the switching circuit 41 are shown with dotted lines.

Figure 3:
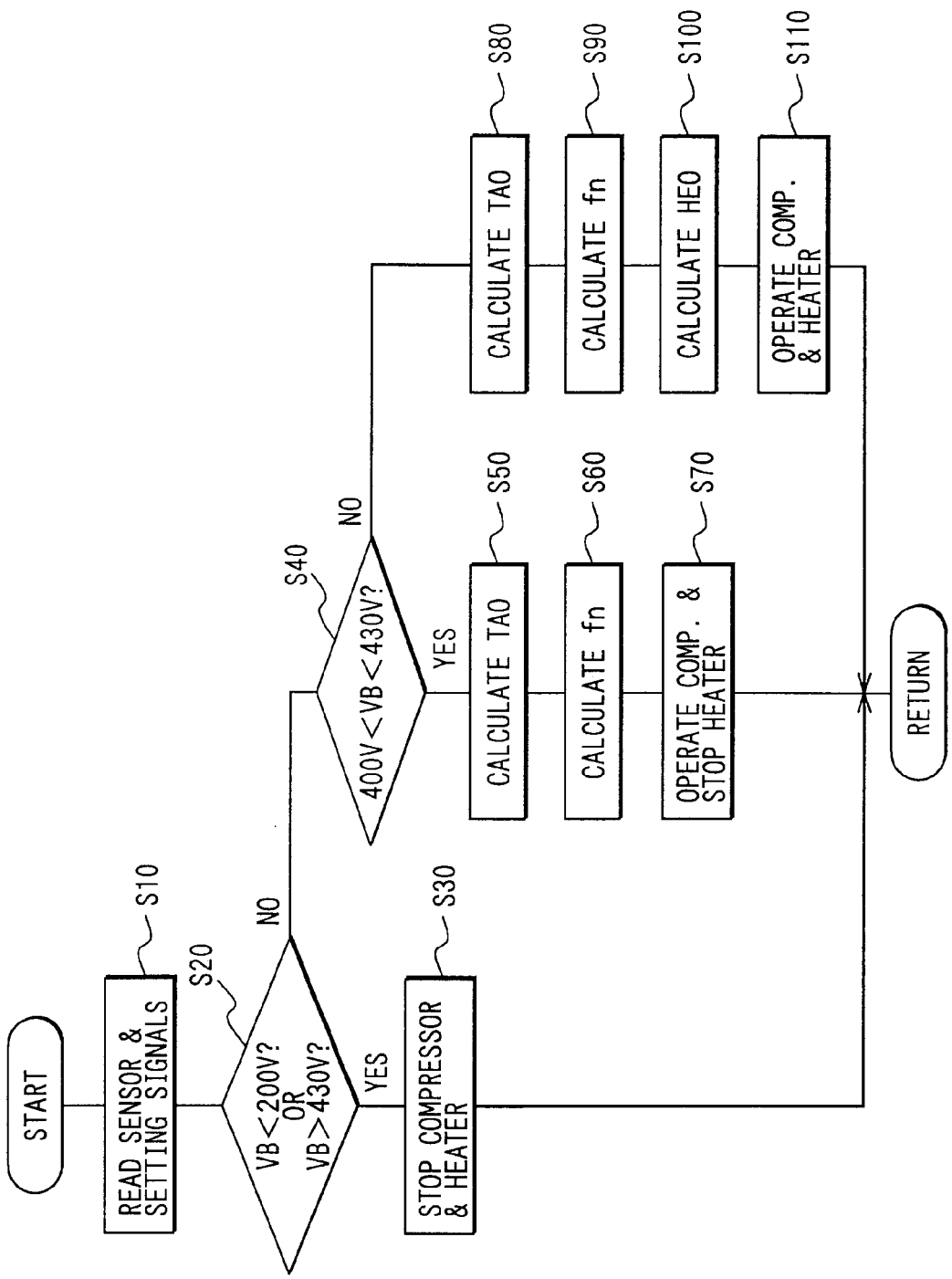
FIG. 3 is a flowchart showing a process of controlling an electrically driven compressor and an electric heater used in the air-conditioner.

Now, referring to FIG. 3, a process of controlling the air-conditioner described above will be explained. At step S10, the setting signals from the control panel 28 and various signals from the group of sensors 34–38 are read. Then, at step S20, whether the battery voltage VB is lower than an operable lowest voltage VL, or whether the battery voltage VB is higher than a second predetermined voltage VH2 is determined. In this particular embodiment, the rated voltage V0 of the battery is 288 volts, the operable lowest voltage VL is set to 200 volts, the second predetermined voltage VH2 is set to 430 volts, and the first predetermined voltage VH1 is set to 400 volts. The first predetermined voltage VH1 is set to 400 volts for securing durability and safety of the electric heater 14. The second predetermined voltage VH2 is set to the level of 430 volts to operate the compressor 12 in a wider range of the battery voltage VB while securing durability of the compressor 12. These voltages may be variously modified according to practical requirements.

Then, if the determination at step S20 is affirmative (i.e., VB<VL, or VB>VH2), the process proceeds to step S30, where the compressor 12 is stopped by turning off the inverter 22 and the electric heater 14 are turned off by turning off the switch circuit 41. That is, both the electric heater 14 and the compressor 12 are stopped to avoid over-discharge of the battery 10 when the battery voltage VB is lower than the operable lowest voltage VL, and both are stopped to secure their durability and safety when the battery voltage VB is higher than the second predetermined voltage VH2.

If the determination at step S20 is negative (i.e., VL<VB<VH2), the process proceeds to step S40, where whether the battery voltage VB is higher than the first predetermined voltage VH1 and lower than the second predetermined voltage VH2 (i.e., VH1<VB<VH2) is determined. If the determination of step S40 is affirmative, the process proceeds to step S50, where a target temperature TAO of conditioned air blown into the passenger compartment is calculated according to the following formula: TAO=(Kset×Tset)−(KR×TR)−(KAM×TAM)−(KS×TS)+C, where Tset is a desired compartment temperature set by the temperature setting switch 31, TR is an inside air temperature detected by the sensor 34, TAM is an outside air temperature detected by the sensor 35, and TS is an amount of sunshine detected by the sunshine sensor 36. Kset, KR, KAM and KS are constants representing gains, and C is an adjustment constant. The calculated TAO is a temperature of conditioned air blown out of the in-room unit 15, which is required to maintain the compartment temperature at the desired temperature Tset irrespective of a heat load variation.

Then, at step S60, a target rotational speed fn of the compressor 12 is calculated based on TAO. More particularly, a target temperature TEO of air blown out of the evaporator 18 is first determined, and then the target rotational speed fn which is necessary to attain TEO is calculated based on TEO and an actual temperature TE measured by the sensor 37. Then, at step S70, a signal corresponding to the target rotational speed fn is fed to the inverter 22 to rotate the compressor 12 at the target rotational speed fn. At the same time, the switching circuit 41 is turned off to terminate operation of the electric heater 14. Thus, the electric heater 14 is switched off when the battery voltage VB is higher than the first predetermined voltage VH1 in order to secure durability and safety of the electric heater 14.

On the other hand, if the determination at step S40 is negative (i.e., VL<VB<VH1), the process proceeds to step S80, where the target temperature TAO is calculated. Then, at step S90, the target rotational speed fn is calculated. TAO and fn are calculated in the same manner as in the steps S50 and S60. Then, at step S100, a target heater output HEO is calculated based on the target temperature TAO. More particularly, a target hot water temperature TWO which is required to obtain TAO is calculated based on TAO and temperature efficiency of the heater core 19, and then the target heater output HEO which is required to obtain TWO is calculated based on TWO and an actual temperature detected by the hot water temperature sensor 38.

Then, at step S110, a signal corresponding to the target rotational speed fn is fed to the inverter 22 to rotate the compressor 12 at the target rotational speed fn. At the same time, power supplied to the electric heater 14 is controlled by switching on and off the switching circuit 41 (duty control) so that the heater output becomes the target heater output HEO.

The electric heater 14 is made of a resistor having a low temperature coefficient, such as nickel-chrome or iron-chrome, as mentioned above. The heater output PH is substantially proportional to a squared value of the battery voltage VB (i.e., $PH \propto (VB)^2$), as shown in FIG. 2. Therefore, the electric heater 14 is overheated if the battery voltage VB abnormally increases. This may cause damages in the electric heater 14, and safety thereof may not be secured. To avoid those problems, the power supply to the electric heater 14 is discontinued when the battery voltage VB increases to the level of the first predetermined voltage VH1 (e.g. 400 volts). In this manner, durability and safety of the electric heater 14 are secured even if the battery voltage VB abnormally increases.

The compressor 12 continues to be operated when the battery voltage VB increases to the level of the first predetermined voltage VH1 (e.g., 400 volts), but its operation is discontinued when the battery voltage VB further increases to the level of the second predetermined voltage VH2 (e.g., 430 volts). When the electric heater 14 is turned off, the temperature of the hot water heated by the electric heater 14 decreases gradually because water has a high thermal capacity. On the other hand, when the compressor 12 is stopped, the temperature of the air blowing out from the evaporator 18 quickly increases because evaporation of the refrigerant is terminated at the same time when the compressor 12 is stopped. Therefore, it is advantageous to operate the compressor 12 in a wider range of the battery voltage VB, compared with an operating range of the electric heater 14.

According to test results, it is preferable to set the first predetermined voltage VH1 to a level which generates two times of the heater output generated by the rated voltage. More particularly, as shown in FIG. 2, when the heater output Po is generated by the rated voltage V0, the first predetermined voltage VH1 is set to a level which generates the heater output 2Po. In this particular embodiment, Vo is 288 volts, and the first predetermined voltage VH1 is set to 400 volts. In this manner, the voltage range in which the electric heater 14 operates can be made reasonably wide while avoiding any chance to damage the electric heater 14.

(Second Embodiment)

Figure 4:
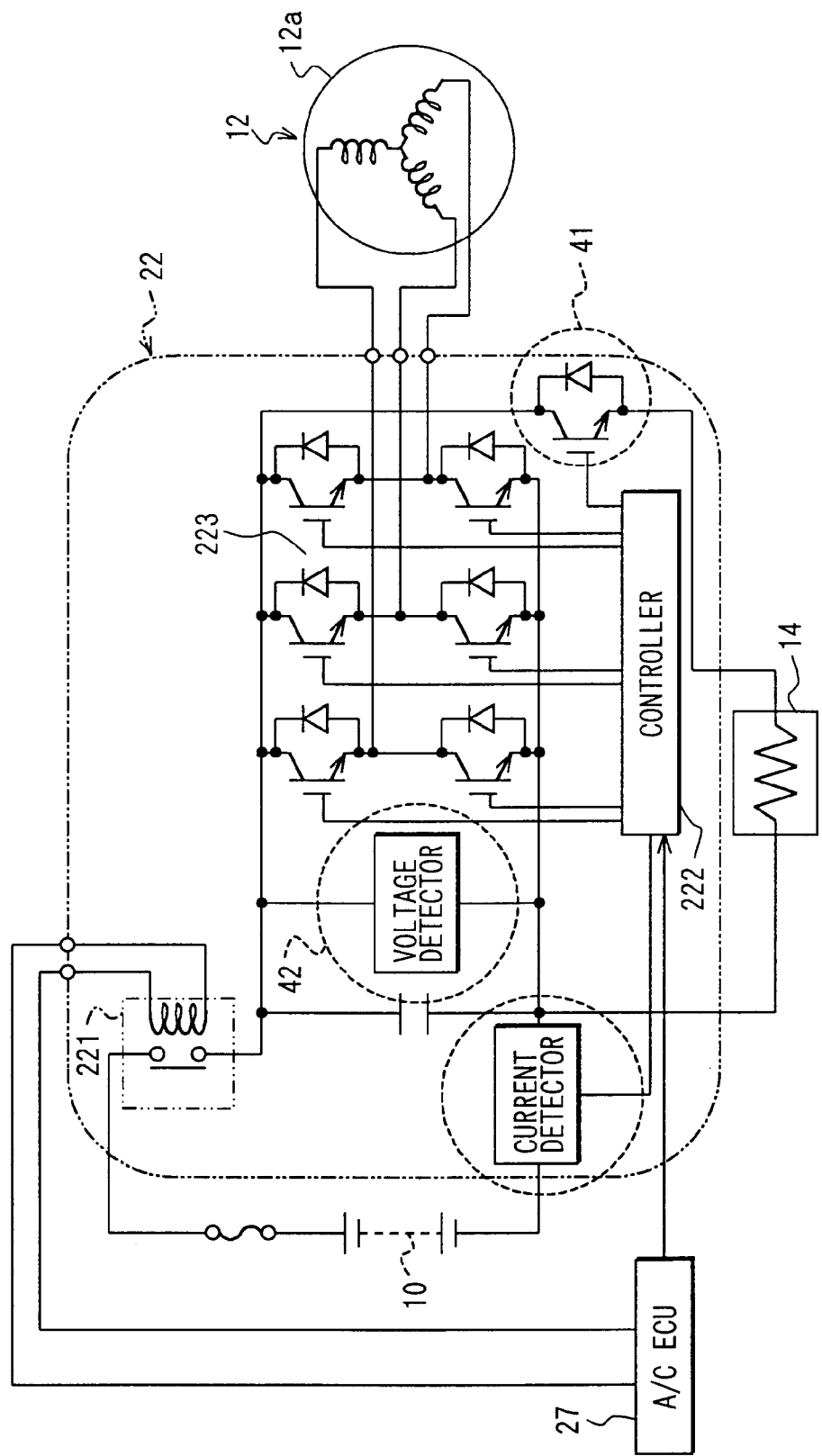
FIG. 4 is an electric circuit showing an inverter that controls operation of a compressor, as a second embodiment of the present invention.

In the first embodiment described above, the voltage detector 42 for detecting the battery voltage VB and the switching circuit 41 for controlling operation of the electric heater 14 are independently disposed at an outside of the inverter 22. In this second embodiment, however, both the voltage detector 42 and the switching circuit 41 are included in the inverter 22, as shown in FIG. 4. In the second embodiment, electric power is supplied to the inverter 22 from the battery 10 through a main relay 221 which is controlled by the ECU 27. A controller 222 to which control signals from the ECU 27 and signals from the voltage detector 42 are fed is also included in the inverter 22.

The controller 222 controls operation of a switch circuit 223 composed of six transistors (IGBTs) that control frequency of the alternating current supplied to the three-phase motor for driving the compressor and controls the switching circuit 41 composed of a transistor (IGBT) that controls power supply to the electric heater 14.

According to the structure of the second embodiment, not only the devices for controlling the compressor 12 but also the switching circuit 41 for controlling the electric heater 14 is contained in the inverter 22.

(Third Embodiment)

Figure 5:
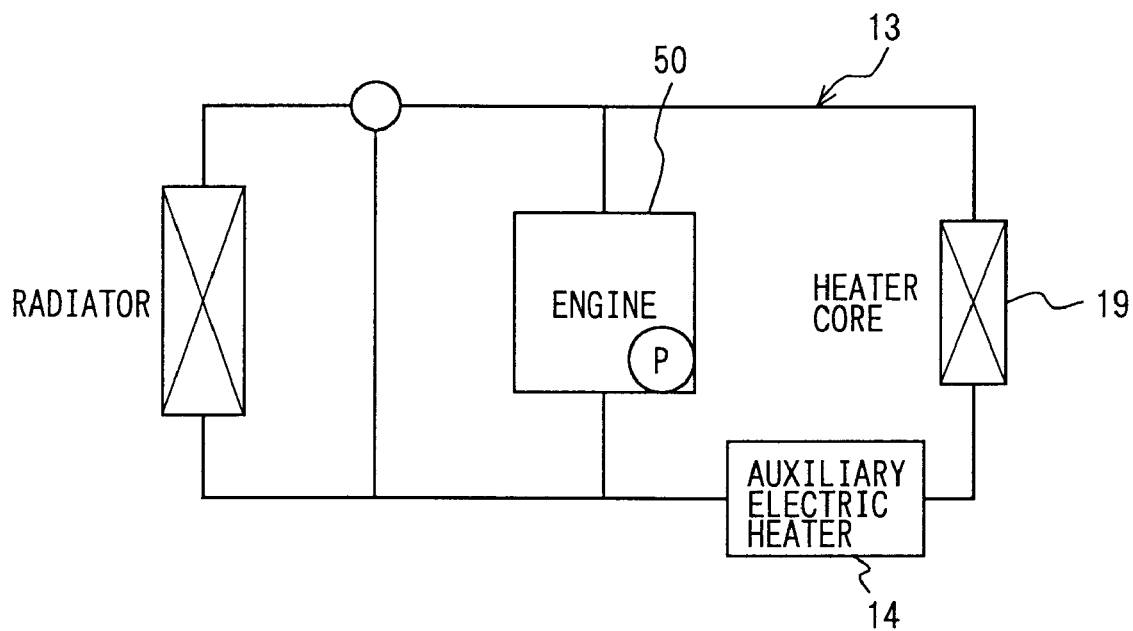
FIG. 5 is a block diagram showing a modified form of a heating circuit as a third embodiment of the present invention.

A third embodiment of the present invention is briefly shown in FIG. 5. In this embodiment, a driving engine 50 for driving a hybrid vehicle is used as a main heat source for heating the heater core 19, and the electric heater 14 is used as an auxiliary heat source in the heating circuit 13. When the air-conditioner of the present invention is used in the hybrid vehicle in this manner, the same advantages obtained in the foregoing embodiments can be attained.

It is also possible to use heat exhausted from a fuel cell mounted on an electric vehicle as a heat source in the heating circuit 13. Also, heat dissipated from a driving motor, the inverter 22 or other electric components may be used as a heat source in the heating circuit 13. It is also possible to directly dispose the electric heater 14 in the casing 15a of the in-room unit 15, thereby eliminating the heater core 19. In this manner, air in the casing 15a is directly heated by the electric heater 14.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An automotive air-conditioner comprising:
   a compressor driven by an electric motor powered by an on-board battery; and
   an electric heater powered by the on-board battery, wherein:
      the electric heater is switched off when a voltage of the on-board battery reaches a first predetermined voltage which is higher than a rated voltage of the on-board battery; and
      operation of the compressor is stopped when the voltage of the on-board battery further increases to a second predetermined voltage which is higher than the first predetermined voltage while keeping the electric heater at a switched-off state.

2. The automotive air-conditioner as in claim 1, further including an inverter for controlling operation of the compressor, a voltage detector for detecting the voltage of the on-board battery and a circuit for switching the electric heater, wherein:
   the voltage detector and the switching circuit are integrally contained in the inverter.

3. The automotive air-conditioner as in claim 1, further including a heater core that heats air blown into a passenger compartment by hot water circulating in the heater core, wherein:
   the electric heater heats the hot water circulating in the heater core.

4. The automotive air-conditioner as in claim 3, further including an evaporator in which refrigerant fed from the compressor evaporates thereby to cool the air blown into the passenger compartment.

5. The automotive air-conditioner as in claim 1, wherein:
   the first predetermined voltage is set to a level at which an output power of the electric heater becomes substantially two times of the output power obtained at the rated voltage of the on-board battery.

6. A method of controlling an automotive air-conditioner having a compressor driven by an electric motor powered by an on-board battery and an electric heater powered by the on-board battery, the method comprising:
   switching off the electric heater when a voltage of the on-board battery reaches a first predetermined voltage which is higher than a rated voltage of the on-board battery; and
   switching off the electric motor when the voltage of the on-board battery further increases to a second predetermined voltage which is higher than the first predetermined voltage, while maintaining the electric heater at a switched-off state.

7. The method of controlling an automotive air-conditioner as in claim 6, wherein:
   the first predetermined voltage is set to a level at which an output power of the electric heater becomes substantially two times of the output power obtained at the rated voltage of the on-board battery.

* * * * *